United States Patent
Schmitz (12)

(10) Patent No.: US 10,830,075 B2
(45) Date of Patent: Nov. 10, 2020

(54) WICK STRUCTURES FOR HEAT PIPE-BASED COOLING

(71) Applicant: MTU Aero Engines AG, Munich (DE)

(72) Inventor: Oliver Schmitz, Munich (DE)

(73) Assignee: MTU Aero Engines AG, Munich (DE)

( * ) Notice: Subject to any disclaimer, the term of this patent is extended or adjusted under 35 U.S.C. 154(b) by 17 days.

(21) Appl. No.: 16/169,560

(22) Filed: Oct. 24, 2018

(65) Prior Publication Data
US 2019/0128130 A1    May 2, 2019

(30) Foreign Application Priority Data

Oct. 27, 2017   (DE) .................. 10 2017 010 023
Jun. 19, 2018   (EP) ..................... 18178418

(51) Int. Cl.
| | |
|---|---|
| F01D 9/06 | (2006.01) |
| B22F 5/04 | (2006.01) |
| F01D 5/18 | (2006.01) |
| F01D 25/12 | (2006.01) |
| F02C 7/12 | (2006.01) |

(Continued)

(52) U.S. Cl.
CPC .............. F01D 9/065 (2013.01); B22F 5/04 (2013.01); F01D 5/18 (2013.01); F01D 5/183 (2013.01); F01D 25/12 (2013.01); F02C 7/12 (2013.01); F28D 15/046 (2013.01); *B22F 3/1055* (2013.01); *B22F 2999/00* (2013.01); *B33Y 10/00* (2014.12); *B33Y 80/00* (2014.12); *F05D 2230/20* (2013.01); *F05D 2230/22* (2013.01); *F05D 2240/12* (2013.01); *F05D 2260/208* (2013.01); *F05D 2300/514* (2013.01)

(58) Field of Classification Search
CPC . F01D 5/18; F01D 5/182; F01D 5/183; F01D 11/00; F01D 25/08; B22F 5/04
USPC .................................. 415/114, 115, 116, 178
See application file for complete search history.

(56) References Cited

U.S. PATENT DOCUMENTS 3,287,906 A * 11/1966 McCormick ............ F01D 5/181
                                                              60/39.511
3,627,444 A * 12/1971 Lentz ..................... B21D 53/78
                                                              416/96 R (Continued)

FOREIGN PATENT DOCUMENTS

| DE | 2101096 A1 | 7/1972 |
|---|---|---|
| DE | 2821270 A1 | 11/1979 |

(Continued)

OTHER PUBLICATIONS

"Heat Pipe Turbine Vane Cooling", Langston, L, Faghri, A.; Advanced Turbine Systems Annual Program Review, Oct. 17, 1995.

*Primary Examiner* — Ninh H. Nguyen
*Assistant Examiner* — Aye S Htay
(74) *Attorney, Agent, or Firm* — Barlow, Josephs & Holmes, Ltd.

(57) ABSTRACT

A guide vane for a turbomachine is disclosed. The guide vane includes a heat pipe wall that is interpenetrated by a capillary system, which has a continuous material transition from a first surface, which delimits the guide vane toward the outside, to a second surface, which lies opposite to the first surface and delimits an evaporation cavity in the interior of the guide vane. Further disclosed is a method for producing a guide vane having a heat pipe wall, wherein at least the heat pipe wall is formed by additive manufacture.

9 Claims, 1 Drawing Sheet

(51) Int. Cl.
*F28D 15/04* (2006.01)
*B33Y 80/00* (2015.01)
*B22F 3/105* (2006.01)
*B33Y 10/00* (2015.01)

(56) References Cited

U.S. PATENT DOCUMENTS

| | | | |
|---|---|---|---|
| 5,975,841 A * | 11/1999 | Lindemuth | F01D 5/181 |
| | | | 415/114 |
| 7,966,807 B2 | 6/2011 | Norris et al. | |
| 8,844,877 B1 | 9/2014 | Driemeyer et al. | |
| 2010/0263388 A1 | 10/2010 | Norris et al. | |
| 2016/0177745 A1* | 6/2016 | Uskert | F01D 5/284 |
| | | | 416/232 |
| 2016/0215634 A1* | 7/2016 | Walston | F01D 9/041 |

FOREIGN PATENT DOCUMENTS

| | | |
|---|---|---|
| DE | 19926817 A1 | 12/2000 |
| EP | 1884625 A2 | 2/2008 |
| EP | 1884628 A2 | 2/2008 |
| EP | 1895124 A2 | 3/2008 |
| EP | 2868866 A1 | 5/2015 |
| EP | 3176672 A1 | 6/2017 |

* cited by examiner

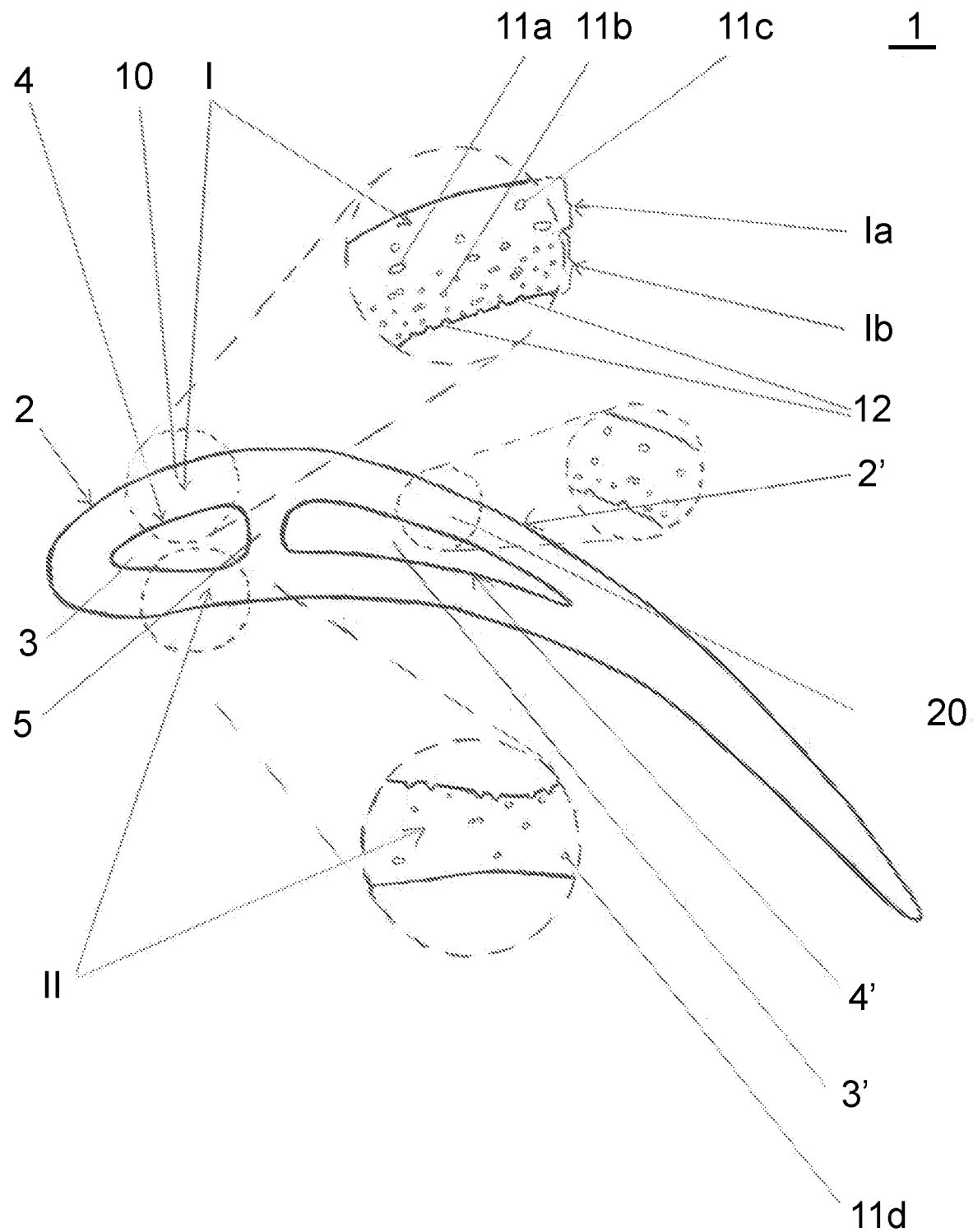

WICK STRUCTURES FOR HEAT PIPE-BASED COOLING

BACKGROUND OF THE INVENTION

The present invention relates to a guide vane for a turbomachine, a system with a guide vane of this kind, as well as a method for producing a guide vane. The guide vane here comprises a heat pipe wall that is interpenetrated by a capillary system in each case.

For various fields of application, the utilization of thermal conductivity technology in the form of heat pipes (which are also referred to as "heat conduction pipes") is known. This technology is based on the principle of heat transfer by means of a circulating fluid, which, in the gaseous state, flows through a cavity from a hot region to a cooler region, condenses there, and, in a liquid state, is taken up by a capillary system. In the capillaries thereof, the fluid is then conveyed back to the hot region, where it evaporates once again.

The use of the named technology for the cooling of guide vanes is described, for example, in the publications "A Parametric Study of Heat Pipe Turbine Vane Cooling" by Z. J. Zuo et al. (International Gas Turbine & Aeroengine Congress & Exhibition, Orlando, Fla., Jun. 2-5, 1997) and "Heat Pipe Turbine Vane Cooling" by L. Langston et al. (Advanced Turbine Systems Annual Program Review, W. Va., Oct. 17-19, 1995). These publications each show guide vanes with cavities, the wall coatings of which form heat conduction pipes. Thermodynamic losses, in particular, which occur during cooling with air admitted into the flow channel, shall thereby be reduced or even avoided.

Disclosed in the publication U.S. Pat. No. 5,975,841 is a heat pipe cooling for a turbine guide vane assembly, which, in particular, is intended to make possible an advantageous discharge of heat. In the interior of a guide vane in this case, a plurality of chambers are formed, the walls of which have a metal powder coating through which a fluid can evaporate into the chambers. The vapor can then flow through the chambers as well as through an adiabatic section into cavities of a condensation rib, at the inner walls of which the vapor condenses. The condensate is conveyed by means of capillaries back to the wall coating of the chambers in the guide vane.

Further prior art is known from the publications U.S. Pat. No. 8,844,877 B1, US 2010/0263388 A1, and EP 1 884 628 A2.

SUMMARY OF THE INVENTION

The present invention has the objects of providing an improved guide vane that is to be cooled by means of thermal conductivity technology as well as a method for producing such a guide vane.

The objects are achieved by a guide vane in accordance with claim 1, a system in accordance with claim 9, and a method according to claim 10. Advantageous embodiments are disclosed in the dependent claims, the description, and the FIGURE.

A guide vane for a turbomachine according to the invention comprises a heat pipe wall that is interpenetrated by a capillary system, that is, a wall of a heat pipe for cooling the guide vane. The heat pipe wall structure has a continuous material transition from a first surface (the heat pipe wall), which delimits the guide vane toward the outside, to a second surface (the heat pipe wall), which lies opposite to the first surface and delimits (at least partially) an evaporation cavity in the interior of the guide vane. Accordingly, at least in the region of the heat pipe wall, the guide vane is not coated toward the evaporation cavity, but rather is formed in a monolithic manner, namely, from a material that extends continuously around the capillaries of the capillary system, from the first surface (which is at least a part of the outer surface of the guide vane) up to the second surface (which forms at least a part of a marginal surface to the evaporation cavity); in accordance with an advantageous embodiment, the guide vane is even formed entirely in a monolithic manner.

The formation of the heat pipe wall according to the invention by avoiding a coating makes possible an efficient cooling of the guide vane with a uniform temperature distribution by means of thermal conductivity technology. In comparison to a coating, the monolithic formation, at least in the mentioned region, improves the heat exposure. In comparison to a conventional guide vane, the guide vane wall in this case can be thinner without loss of stability and, accordingly, can be formed with less mass, since the capillaries of the capillary system are embedded in the region of the heat pipe wall as part of the guide vane wall directly in said wall. A guide vane according to the invention can preferably be produced entirely or partially by means of an additive manufacturing method, such as, for example, by means of selective laser welding.

A method according to the invention serves for producing a guide vane according to the invention in accordance with one of the embodiments disclosed in this specification. At least the heat pipe wall of the guide vane with the capillary system is formed here by means of additive manufacture, such as, for example, by means of selective laser welding; in accordance with a special embodiment variant, the entire guide vane is produced by additive manufacture.

Additive manufacture makes it possible in a simple way to integrate a respective capillary system into the guide vane material, without the geometric constraints limiting the respective formation of the capillaries. The method therefore allows, in particular, an optimization of the capillary system in terms of thermal conduction and in terms the avoiding losses in the case of through-flow pressure.

A system according to the invention contains at least one guide vane according to the invention in accordance with one of the embodiments disclosed in this specification. In this case, the capillary system of the at least one guide vane is at least part of an internal volume enclosed in the system, said volume containing a cooling fluid. In this case, the cooling fluid is preferably adapted for the purpose of being evaporated in a hot region of the system that is to be cooled and of being condensed in a cold region of the system at which heat can be discharged. The cooling fluid can be, for example, a liquid metal.

A guide vane according to the invention can be a turbine guide vane or a compressor guide vane.

Because the cooling in a system according to the invention is based on a closed internal volume and no cooling air is required, the cooling can occur independently of the respective air pressure. A guide vane according to the invention or a system according to the invention is therefore suitable for use under high pressure situations, in particular. A guide vane according to the invention or a system according to the invention can be adapted, in particular, for the purpose of being utilized in a high-pressure compressor (and, accordingly, close to the combustion chamber).

In accordance with an advantageous embodiment of the present invention, the heat pipe wall has at least one region, in which—in relation to its wall strength—it comprises two halves with porosities that differ from each other (and/or with total capillary lengths that differ from each other), two or three thirds with porosities (and/or total capillary lengths) that differ (respectively) from each other, and/or two, three, or four quarters (and/or total capillary lengths) that differ (respectively) from each other. In this case, the mutual separation between the halves is represented (preferably abstractly, that is, conceptually, without being reflected in material terms) in each case by points that are at the same distance from the first surface as they are from the second surface; this applies analogously to the separation between the thirds or fourths (for which the relative distance is, correspondingly, 1:2 or 2:1 (for thirds) or 1:3, 2:2, or 3:1 (for fourths)).

"Porosity" is understood to mean the ratio of the capillary volume contained in the respective fraction (that is, the cavity/cavities formed by capillaries) to the total volume of the fraction. The "total length of the capillaries" is obtained as the sum of all lengths of capillary sections in the respective fraction (that is, in the respective half or the respective third or fourth).

In this specification, "region" of the heat pipe wall refers to a part of the heat pipe wall that extends continuously from a first surface region on the first surface to a second surface region on the second surface.

An enhancement is advantageous, in which the porosity in an outer half (that is, a half that faces the outer surface of the guide vane)—(or in an outermost third or in an outermost fourth)—of the at least one region of the heat pipe wall is smaller than in the half lying further inward (that is, the half that faces the evaporation cavity) (or a further inner-lying third or fourth). Preferred, in particular, is a variant in which the porosity of the respective fractions increases inwards, so that, therefore, an outermost third has a lower porosity than a middle third of the heat pipe wall, which, in turn, has a lower porosity than a third of the heat pipe wall that lies furthest inward; analogously, the porosity increases inwards from quarter to quarter.

In this way, it is possible to bring about an advantageous feeding of liquid through the capillaries to the second surface, which delimits the evaporation cavity of the heat pipe wall, and it is possible for a uniform distribution of the liquid on this surface to occur, which brings about an especially productive evaporation.

Analogously, the porosity of the heat pipe wall can vary along the surface of the heat pipe wall: In accordance with an advantageous embodiment of the present invention, the heat pipe wall has two or more regions that have porosities that (overall) differ from one another. As a result of this, the respective porosity (and accordingly the capillary system in the respective region) can be adapted to a particular position of the region at the guide vane; one of the regions can have, for example, a greater distance to a leading edge than does another of the regions and/or the regions can be arranged on different sides (pressure side or suction side) of the guide vane, and/or differ (in relation to an axis of rotation of the rotor) in terms of their radial position or in terms of their respective distance from a tip of the guide vane; in this case, the respective distance is preferably defined by the distance of a point of the respective region that lies closest to the tip of the guide vane.

In this way, in each case, an optimal heat transport in the respective region can be established. In particular, owing to the local differences in the porosity, it is possible to achieve a respective local cooling in an advantageous manner. For example, in regions in which a strong cooling is to be brought about, an especially large number of finely branched capillaries or a region with a high porosity are arranged or will be arranged (in a method according to the invention).

The capillaries of the capillary system open into the evaporation chamber, in each case, preferably in at least one particular pore formed in the second surface. In contrast, the first surface of the heat pipe wall that delimits the guide vane toward the outside is preferably formed in a closed manner, that is, free of pores. In particular, the capillary system is preferably closed toward the first surface; that is, the guide vane in a region of this surface is formed in a solid manner. The capillary system then has no fluid connection to the first surface. In this way, it can be ensured that the cooling circulation proceeds with evaporation and condensation without any loss.

Preferably, the capillary system comprises at least two capillaries or capillary sections, which have cross-sectional faces (perpendicular to a flow direction of fluid through the capillaries) that are different from each other. The cross-sectional faces can differ, for example, in terms of their geometric shape and/or in terms of their diameter (as the greatest distance occurring between two marginal points of the cross-sectional surface). By means of the different capillaries or capillary sections, it is possible to achieve an optimal relationship between through-flow and heat transfer.

An embodiment of the present invention is advantageous, in which the capillary system has a plurality of branches. In particular, in at least one region of the heat pipe wall, the capillary system can preferably have a branching that increases from the outside inward (that is, toward the evaporation cavity). Thus, it is possible for liquid to wet the second surface as uniformly as possible, and, accordingly, an especially strong evaporation and hence an especially effective cooling of the guide vane can be achieved.

In accordance with an advantageous embodiment, in its interior, the guide vane has at least one additional evaporation cavity, which is delimited at least partially by another heat pipe wall that is interpenetrated by a capillary system. Like the first heat pipe wall, the at least one other heat pipe wall in this case preferably has a continuous material transition from an outer surface of the guide vane to an inner surface of the other heat pipe wall, which delimits the additional evaporation cavity.

Preferably, a partition wall separating the evaporation cavities is formed in an embodiment of this kind, also as a heat pipe wall that is interpenetrated by a capillary system, and said partition wall has a continuous material transition from a surface that (partially) delimits the first evaporation cavity to the surface that delimits the additional evaporation cavity. In this way, with the partition wall to the first evaporation cavity and/or to the additional evaporation cavity, it is possible to make available an enlarged evaporation surface, so that the extent of the cooling is further improved.

The capillary system in the first heat pipe wall and the capillary system of the at least one other heat pipe wall can be separated from each other or joined to each other (in the guide vane or within a system containing the guide vane according to the invention). This applies analogously, if need be, to the capillary system in the partition wall.

In embodiments of this kind, the first heat pipe wall and the at least one other heat pipe wall can be formed analogously (for example, each with at least one region that—in relation to the wall strength of the heat pipe wall in the respective region—has halves, thirds, and/or quarters with porosities that differ from one another, as described above, in particular with a porosity that increases inwards) or they can be formed differently. Alternatively or additionally, the first and the at least one other heat pipe wall may have overall (essentially) the same porosities or may have porosities that differ from each other.

BRIEF DESCRIPTION OF THE DRAWINGS

A preferred exemplary embodiment of the invention will be explained in detail below on the basis of a drawing. It is understood that individual elements and components can also be combined in ways that are different from that illustrated.

Schematically shown is:

FIG. 1: an exemplary embodiment of a guide vane according to the invention in cross section.

DESCRIPTION OF THE INVENTION

Illustrated in FIG. 1 in cross section is an exemplary guide vane 1 in accordance with an embodiment of the present invention; in this case, the cross section lies in a plane, perpendicular to which lies a radial (in relation to the axis of rotation of a turbomachine in which the guide vane can be used) axis (not illustrated).

The guide vane 1 has a heat pipe wall 10, which is delimited by a first (outer) surface 2 of the guide vane, and a second surface 4, which lies opposite to it; the second surface 4 delimits an evaporation cavity 3 lying in the interior of the guide vane.

As illustrated schematically in the FIGURE by means of circled enlargements for the regions I, II, the heat pipe wall 10 is interpenetrated by a capillary system with capillaries; only the capillaries 11a, 11b, 11c, 11d of which are furnished with reference numbers in the FIGURE for reasons of clarity.

The capillary system is closed toward the first surface 2 and hence the surface 2 is free of pores, whereas the second surface forms a plurality of pores 12, through which the fluid (not shown) in the capillary system can evaporate into the evaporation cavity 3.

The hot vapor is carried through the evaporation cavity 3 into a cooler section of the guide vane or of a connected component (not illustrated in the FIGURE), where it condenses or is taken up by the capillaries of the capillary system (or, if appropriate, by the capillaries of the component connected thereto), before, by exploiting the capillary forces, it is conveyed through the capillary system, in turn, to the pores 12, where the circulation begins once again. With the heat pipe wall 10 and the evaporation cavity 3, the guide vane 1 thus forms a heat pipe. The evaporation process as well as the flow of the cooled liquid fluid through the capillaries brings about a cooling of the guide vane.

In this case, the heat pipe wall has a continuous material transition from the first surface 2 to the second surface 4; that is, it is formed in a monolithic manner from a material that extends continuously around the capillaries from the first surface 2 to the second surface 4. In particular, the guide vane can be produced, at least in the region of the heat pipe wall, preferably by means of additive manufacture, such as, for example, by means of selective laser melting.

In particular, in the embodiment illustrated, in the region I, the heat pipe wall 10 can be divided, in relation to its wall strength (conceptually), into two halves Ia, Ib, which differ in regard to their respective porosity: The ratio of the capillary volume contained in the half Ia (that is, the cavity/cavities formed by capillaries) to the total volume (the half Ia) is smaller than the corresponding ratio in the half Ib. In the outer half Ia, the guide vane is thus especially solid.

Alternatively or additionally, a total length of capillaries per unit volume in the half Ia is preferably less than a total length of capillaries per unit volume in the half Ib. In particular, the capillaries in the heat pipe wall preferably branch from the outside inwards and open into a correspondingly large number of pores 12 at the second surface 4, so that they can be appropriately well wetted by the fluid carried through the capillary system. In this way, it is possible to bring about an especially good evaporation and thus cooling of the guide vane (in the region of the second surface) and, on the other hand, a portion of the fluid, which is still to be conveyed inside of the heat pipe wall over a longer path through the capillaries and to a more distant site of the second surface 4, can be conveyed through capillaries that are more distant from the second surface 4. It is also possible for such an outer half Ia of the guide vane to be cooled effectively by means of the liquid fluid carried through it and, in addition, a high stability of the guide vane can be ensured. This applies analogously to corresponding thirds or quarters of the region I.

The cross sections of the capillaries (or of the capillary sections sliced in the FIGURE) that are shown have in part different shapes and/or sizes (or diameters). Preferably, the capillaries in the further outer-lying half Ia have a larger mean flow diameter than the capillaries in the further inner-lying half Ib. This applies analogously in each case to corresponding thirds or quarters of the region I.

As can be seen in FIG. 1, in the region II (which is arranged at the pressure side of the guide vane), the heat pipe wall 10 has a different porosity, which, in this case, is less than that in the region I (which lies at the suction side of the guide vane). In particular, it is thereby possible to take into consideration the effect of an outer flow on the temperature of the guide vane and thus, on the one hand, to optimize the cooling of the guide vane, and, on the other hand, to optimize the stability thereof.

The illustrated guide vane 1 has, in addition to the heat pipe wall 10, another heat pipe wall 20, which delimits an additional evaporation cavity 4' in the interior of the guide vane 1 and accordingly, together with it, forms another heat pipe. Accordingly, the other heat pipe wall 20 is also interpenetrated by a capillary system and also has a continuous material transition from an outer surface 2' of the heat pipe wall 20, which delimits the guide vane toward the outside, from the other surface 4', which delimits the evaporation cavity 3'. The capillary system in the heat pipe wall 10 and the capillary system in the heat pipe wall 20 can be joined to each other or separated from each other inside the guide vane (neither of which is visible).

In the present case, the evaporation cavities 3 and 3' are separated from each other by a partition wall 5. Preferably, the capillary system in the heat pipe wall 10 and/or the capillary system in the heat pipe wall 20 (each) extend or extends into the partition wall (not illustrated). Alternatively or additionally, the partition wall 5a comprises a capillary system that is separate (from the previously named capillary systems).

A guide vane 1 for a turbomachine is disclosed. The guide vane comprises a heat pipe wall that is interpenetrated by a capillary system 10, which has a continuous material transition from a first surface 2, which delimits the guide vane outwards, to a second surface 4, which lies opposite to the first surface and delimits an evaporation cavity 3 in the interior of the guide vane.

Further disclosed is a method for producing a guide vane with a heat pipe wall, wherein at least the heat pipe wall 10 is formed by means of additive manufacture.

What is claimed is:

1. A guide vane for a turbomachine, comprising a heat pipe wall that is interpenetrated by a capillary system, wherein the heat pipe wall has a continuous material transition from a first surface, that defines an exterior surface of the heat pipe wall which delimits the guide vane toward an outside, to a second surface, which lies opposite to the first surface and defines an interior surface which delimits an evaporation cavity in the interior of the guide vane, wherein the capillary system has no fluid connection to the first surface, such that the first surface is free of the capillary system, wherein the capillary system has fluid connection to the second surface, and wherein the capillary system is configured and arranged for cooling circulation with evaporation and condensation without any loss.

2. The guide vane according to claim 1, wherein the heat pipe wall comprises at least one region that extends between a surface region of the first surface and a surface region of the second surface, in which the heat pipe wall has, two halves with porosities that are different from each other or total lengths of the capillaries that are different from each other, or two or three thirds with respective porosities that are different from each other or total lengths of the capillaries that are different from each other, or two, three, or four quarters with respective porosities that are different from each other or total lengths of the capillaries that are different from each other.

3. The guide vane according to claim 1, wherein the heat pipe wall has two or more regions that each extend between a surface region of the first surface and a surface region of the second surface and have porosities that are different from each other.

4. The guide vane according to claim 3, wherein at a same radial distance, the two or more regions differ in terms of their respective distance from a tip of the guide vane.

5. The guide vane according to claim 1, wherein the capillary system comprises capillaries or capillary sections with different cross-sectional faces.

6. The guide vane according to claim 1, wherein the capillary system has a plurality of branchings.

7. The guide vane according to claim 1, wherein the heat pipe wall is a first heat pipe wall and the evaporation cavity is a first evaporation cavity, and wherein, in the interior of the guide vane, at least one additional evaporation cavity is arranged, which is delimited at least partially by an inner surface of at least one other heat pipe wall of the guide vane, wherein the at least one other heat pipe wall is interpenetrated by another capillary system and has a continuous material transition from a surface of the other heat pipe wall, which delimits the guide vane toward the outside, to the inner surface.

8. The guide vane according to claim 1, wherein the capillary system of the guide vane is at least part of an internal volume enclosed in a system having at least one guide vane, which contains a cooling fluid.

9. A guide vane according to claim 1, wherein at least the heat pipe wall with the capillary system is formed by additive manufacture.

* * * * *